(12) United States Patent
Lin et al.

(10) Patent No.: US 6,400,701 B2
(45) Date of Patent: *Jun. 4, 2002

(54) ASYMMETRIC INTERNET ACCESS OVER FIXED WIRELESS ACCESS

(75) Inventors: Jie Lin, Torquay; Richard John Driscoll, Totnes, both of (GB)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,736

(22) Filed: Mar. 31, 1998

(51) Int. Cl.$^7$ .............. H04J 3/00; H04Q 7/20
(52) U.S. Cl. .......... 370/336; 370/345; 370/350; 370/458; 370/524; 455/450
(58) Field of Search ............... 370/336, 337, 370/345, 347, 349, 350, 352, 353, 354, 453, 451, 458, 460, 522, 524, 912; 455/450, 452, 509, 518, 453, 519; 340/825.52, 825.53, 468, 477

(56) References Cited

U.S. PATENT DOCUMENTS

| | | | | |
|---|---|---|---|---|
| 4,803,726 A | * | 2/1989 | Levine et al. ............ | 380/48 |
| 5,101,407 A | | 3/1992 | Harvey et al. ........... | 370/95.3 |
| 5,276,703 A | * | 1/1994 | Budin et al. ............. | 370/347 |
| 5,598,417 A | | 1/1997 | Crisler et al. ........... | 370/348 |
| 5,708,655 A | * | 1/1998 | Toth et al. .............. | 370/313 |
| 5,717,830 A | * | 2/1998 | Sigler et al. ............ | 455/426 |
| 5,729,534 A | * | 3/1998 | Jokinen et al. .......... | 370/280 |
| 5,740,166 A | * | 4/1998 | Ekemark et al. ........ | 370/331 |
| 5,771,462 A | * | 6/1998 | Olsen .................... | 455/524 |
| 5,774,461 A | * | 6/1998 | Hyden et al. ........... | 370/329 |
| 5,881,061 A | * | 3/1999 | Iizuka et al. ........... | 370/337 |
| 5,983,270 A | * | 11/1999 | Abraham et al. ........ | 709/224 |

\* cited by examiner

Primary Examiner—Alpus H. Hsu
Assistant Examiner—Afsar M. Qureshi
(74) Attorney, Agent, or Firm—Lee, Mann, Smith, McWilliams, Sweeney & Ohlson

(57) ABSTRACT

A radio base station in a Fixed Wireless Access System broadcasts downlink data packets, each packet being transmitted on a single logical channel. A plurality of network subscribers in a sector may be members of a user group, each user group configured to receive and transmit packets transferred on a specific single logical channel only. Packets include a destination address which specifies a member of the user group. The packets include a token which specifies which user group member may transmit uplink data to the base station on the next frame. Logical channels are yielded for use by circuit switched traffic when required.

5 Claims, 11 Drawing Sheets

| USER | PNID | GID | UID |
|---|---|---|---|
| 305 | 234 | 2 | 0 |
| 306 | 200 | 2 | 1 |
| 307 | 212 | 2 | 2 |
| 308 | 253 | 2 | 3 |

ASYMMETRIC INTERNET ACCESS OVER FIXED WIRELESS ACCESS

FIELD OF THE INVENTION

The present invention relates to telecommunications networks and particularly, although not exclusively, to communicating packet data in Fixed Wireless Access (FWA) networks.

BACKGROUND TO THE INVENTION

In a fixed wireless access (FWA) telecommunications system, subscribers are connected to a backbone telecommunications network by means of radio links in place of traditional copper wires. Each of a plurality of subscribers is provided with a subscriber radio terminal. A plurality of subscriber radio terminals of a plurality of subscribers premises communicate with a base station which provides cellular coverage, typically in urban environments over a 5 km radius. Each base station may be connected to a Public Switched Telecommunications Network (PSTN) switch via a conventional transmission link, known as a backhaul link. A number of potential subscribers sites in a base stations' area of transmission can be of the order of several thousands. A single base station can serve up to several thousand subscribers, making the installation and maintenance cost of a fixed wireless access system lower than that of an equivalent copper wire access network.

Referring to FIG. 1 herein, there is illustrated a prior art fixed wireless access system. A plurality of subscriber radio terminals 100 each comprising a transceiver 101 and an antenna 102, part of a residential subscriber system (RSS) installed at a subscriber's premises, communicate with a radio base station 103 having a base station antenna 104 and a base station transceiver apparatus 105. A plurality of such radio base stations 103 each communicate with a central office switch 106 to gain access to a backbone telecommunications network 111, eg a Public Switched Telephone Network (PSTN) or an Integrated Services Digital Network (ISDN). In a geographical area, each base station 103 is connected to a local exchange switch 106 via a backhaul transmission line 107 which may comprise for example a terrestrial line eg fiber optic cable or coaxial cable, or a microwave transmission link. Communication between the subscriber radio terminal and the base station is via a wireless radio link 108. Each local wireless link 108 between radio base station 103 and subscriber radio terminal 100 comprises an uplink beam from the subscriber transceiver and antenna to the radio base station, and a downlink beam transmitting from the radio base station antenna and transceiver to the subscriber antenna and transceiver. Equal spectrum of frequency slots are allocated for uplink and downlink according to a frequency division duplex scheme, in which a first frequency of a frequency pair is allocated for uplink transmission and a second frequency of the frequency pair is allocated for downlink transmission.

Conventional fixed wireless access systems are narrow band systems which are mainly designed for providing narrow band circuit switched telecommunications services such as telephony, fax or modem. On the other hand, with increased penetration of personal computers into domestic residential markets, access to Internet services is increasingly demanded by subscribers. Thus, it is desirable for subscribers to a FWA system to be able to connect their Personal Computers (PCs) 109 to their RSSs for accessing the Internet rather than require a conventional wire based communications network line to be installed at their premises. The most popular Internet services include world wide web services and downloading of files. In particular, subscribers are increasingly making use of Internet services downloaded from Internet service providers. Internet access traffic is characterized as being highly asymmetric in the transfer of data as between a subscriber and an Internet service provider. This results in a significant difference in data rate in one direction on a subscriber line compared with another, appropriate direction. Internet access also has the characteristic of having a relatively long holding time. For example, a World Wide Web (WWW) session may last for a few hours.

For example, a dominant Internet access traffic type in the residential subscriber market is generated by web browsing. Typical figures on an average download on a page of data by a subscriber is around 50 kBytes, and some estimates project an increase of this figure to around 150 kBytes by the year 2000. Assuming subscribers will tolerate a 6 second waiting time during the page download, a peak data rate for download of web browsing data over a fixed wireless access link is of the order of 64 kbits/s increasing to around 192 kbits/s by the year 2000. After page download, subscribers typically take time to study the information downloaded. Estimates of an average time for such study is around 24 seconds, giving an average data rate on a fixed wireless access downlink of around 13 kbits/s, estimated to increase to around 39 kbits/s by the year 2000.

However, on an uplink, data sent from a subscriber to an Internet service provider is typically very light compared to the data downloaded from the Internet service provider. An approximate estimate of uplink loading requirement is that the uplink loading is typically around one tenth of the downlink loading for Internet services, ie one subscriber will produce a peak uplink rate of around 6.4 kbits/s (increasing to 19.2 kbits/s by the year 2000) and an average data rate of 1.3 kbits/s (increasing to 3.9 kbits/s by the year 2000).

Whilst conventional fixed access wireless systems may be efficient for services, eg voice data, having a relatively balanced data rate in each direction, maintaining a circuit switched connection over a fixed wireless access link for services having an asymmetry of data rate as between different directions of a subscriber link is inefficient use of available wireless link bandwidth.

FIG. 2 of the accompanying drawings schematically illustrates a prior art uplink transmission from RSS antenna 102 to radio base station 103. The uplink transmission 201 comprises a sequence of timeslots, each lasting approximately 300 microseconds. A first timeslot 202 of transmission 201 comprises an uplink transmission from subscriber to the base station. Timeslot 203, immediately following timeslot 202, would usually represent a pause in the transmission by the the subscriber whilst the base station receives data transmitted in timeslot 202. Timeslot 204, which immediately follows timeslot 203, usually represents a gap when the RSS is still unable to make a downlink transmission to the subscriber RSS. Timeslot 205, which immediately follows timeslot 204, represents a second timeslot when the radio base station is able to make a downlink transmission to the subscriber RSS. Thus, each downlink transmission timeslot is separated by two intermediate timeslots.

Gap timeslot 204 represents a delay when the RSS may change the carrier frequency which it uses to transmit to the base station. Other procedures may also be executed by the RSS during timeslot 204 and other subscriber terminals may communicate with the base station. The gap may also exist in order to allow a transmit timeslot 205 (immediately following timeslot 204) to be time aligned with other transmissions, ie to attempt to ensure that all transmissions to the radio base station arrive at the same time.

In addition to data transfer relating to internet services being asymmetric, ie, considerably more data being transmitted on the downlink than on the uplink as discussed herein above, the data transferred can be of a bursty nature, thus the data is transmitted intermittently, compared with, for example, voice data which tends to be continuous. The continuous nature of circuit switch data, such as voice, means that it is undesirable for the RSS to change the carrier frequency which results in gaps, such as timeslots 204. However, for package switch data, the constraints of maintaining continuous data transfer is not present, therefore, it is more acceptable for the RSS to change carrier frequency more frequently, because the bursty nature of the data transferred allows a training sequence to take place during the gaps in data transfer.

In general, each subscriber RSS will experience different propagation characteristics over its uplink/downlink air interface. The radio base station transmits on the downlink over a plurality of downlink frequencies. Each downlink frequency is divided into a plurality of timeslots. It may not be possible for each subscriber RSS to communicate on all of the downlink frequencies offered by the radio base station. Individual subscriber RSSs may be restricted to a selection of a few of the downlink frequencies available. As bearer timeslots on preferred downlink frequencies become occupied by communications, it is inefficient to place an existing circuit switched connection onto a different bearer timeslot on a different carrier frequency. The reason for this inefficiency is that every time a circuit switched connection is moved from one to bearer timeslot to another bearer timeslot, there is a relatively long training sequence required for transfer of that circuit switched connection between different bearer timeslots. Thus, consecutive bearer timeslots carrying a circuit switched connection must be at least two intermediate timeslots apart to allow transfer of a circuit switched connection from one bearer timeslot to another bearer timeslot. For example, a circuit switched connection on a frequency division duplex pair may carry a first 500 µs timeslot for transmit on the uplink, and then receive a second 500 µs timeslot on the downlink, before proceeding to transmit a third 500 µs timeslot on the uplink followed by a fourth 500 µs timeslot on the downlink, and so on throughout the duration of a circuit switched connection. For a change of carrier frequency, there must be an interruption in communication, since changing the circuit switch connection from one frequency to another takes longer than 1000 µs, meaning that a transmit timeslot or a received timeslot must be omitted in the communication. Since data carried on circuit switch connections, eg voice data is more susceptible to interruptions than packet switched data, to avoid degradation of grade of service, it is more efficient once the circuit switched connection is set up, to retain that circuit switched connection on a same bearer timeslot on a same carrier frequency. However, packet switched data may tolerate higher levels of delay, due to the bursty nature of data transfer and also since the packet switched data may be completely retransmitted if necessary, it is not as delay sensitive as circuit switched traffic (eg voice data) in general.

SUMMARY OF THE INVENTION

An object of the present invention is to provide efficient packet switched data transfer for subscribers to a FWA network. This may be achieved by taking advantage of the asymmetric and bursty nature of data transfer resulting from use of services such as internet access.

A further object of the present invention is to provide a bandwidth on demand data packet transfer system over a FWA network.

Preferably, a group of users in a cell transmitted to by a radio base station share a common logical channel on a frame by frame basis which can be yielded to circuit switched traffic when there are few or no more spare air side logical channels available for the circuit switched data. Logical channel sharing is preferably provided in the form of closed user groups wherein each user of the user group is required to register and join the group before using the shared logical channel. Preferably, a user group forms a virtual pipe over an air interface and data packet at both ends of the air interface may be dynamically routed or switched along a number of parallel user groups. Preferably, the system can be added to an existing known air interface protocol. The system may take advantage of a broadcast nature of downlink transmissions from a radio base station so that several subscribers belonging to a closed user group may listen to the same logical channel and, using a token mechanism, a user who may make an uplink transmission on a next frame may be decided.

According to one aspect of the present invention there is provided a communications apparatus for transferring packet switched data said apparatus comprising:

a radio base station capable of transmitting downlink data packets each said data packet being transferred in a specified single timeslot replicating over a plurality of time frames; and at least one network subscriber equipment capable of receiving said downlink data packets;

wherein said subscriber equipments are joined as members of at least one user group, each said user group configured to receive said downlink packets in said specified single repeating timeslot only.

According to a second aspect of the present invention there is provided a method of communicating packet switched data comprising the steps of:

communicating a downlink data packet from a radio base station to at least one network subscriber equipment, wherein said network subscriber equipment is registered as a member of a user group, said user group configured to receive said downlink packets in a specific single timeslot only.

According to a third aspect of the present invention there is provided a method of communicating packet switched data over a wireless link, said method comprising the steps:

registering at least one subscriber lines for receipt of said packet switched data on a downlink channel of said wireless link; and communicating said packet switched data on said downlink channel;

wherein said downlink packet switched data carries an address of a group of registered said subscriber lines, for which said data is intended.

According to a fourth aspect of the present invention there is provided a method of communicating packet switched data over a wireless link, said method comprising the steps of:

registering at least one subscriber line for receipt of said packet switched data on a downlink channel of said wireless link;

allocating a single uplink channel of said wireless link for receipt of packet switched data from a group of said subscriber lines;

transmitting a token data on said downlink, said token data indicating which of said registered subscriber lines has authorization to transmit on said uplink channel.

According to a fifth aspect of the present invention there is provided a method of communicating packet switched data over a wireless link, said method comprising the steps of:

receiving packet switched data on a downlink channel of said wireless link, said downlink channel allocated for receipt by a group of subscriber lines;

receiving a token data indicating authorization to transmit packet switched data on an allocated uplink channel; and transmitting said packet switched data on said allocated uplink channel.

According to a sixth aspect of the present invention there is provided a method of registering a plurality of users of a communications network for receipt of packet switched data services over a wireless link, said method comprising the steps of:

receiving a registration request from a said network user;

in response to said registration request, allocating a user identification data to said user;

allocating an identification data to said user; and allocating at least one logical communications channel to said user.

According to a seventh aspect of the present invention there is provided in a communications network operating a wireless link for communicating packet switched data to a network user of at least one channel of a plurality of channels, a method of re-synchronizing a user with a said channel to which said user has been previously assigned, said method comprising the steps of:

determining if said user is already assigned to a said logical channel;

if said user is already assigned to said logical channel, retrieving data identifying a user group to which said user belongs;

a logical channel to which said group is assigned;

a physical channel to which said group is assigned; and transmitting said data identifying said user group, said logical channel and said physical channel over said wireless link.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Figure 1:
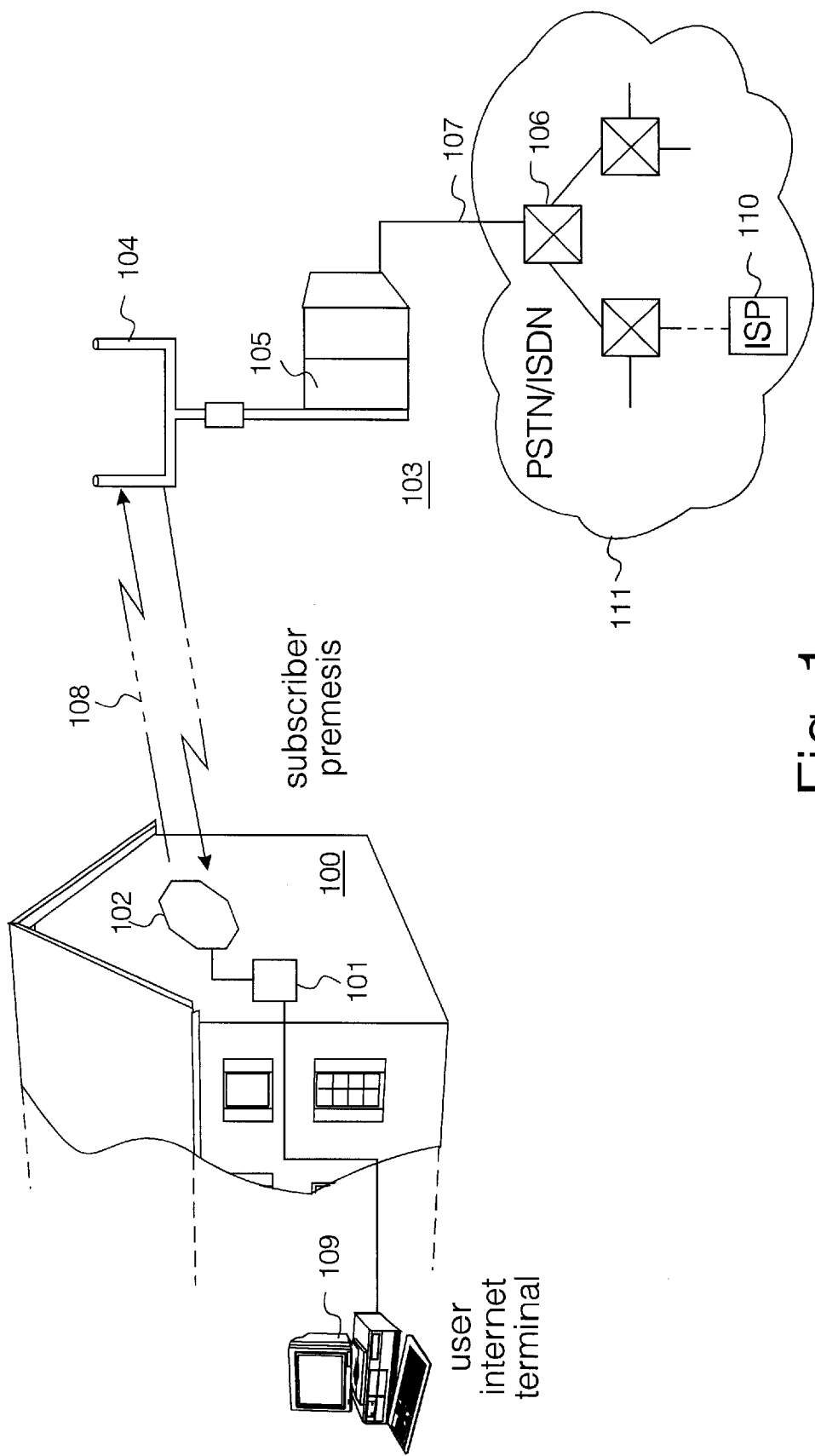
Figure 2:
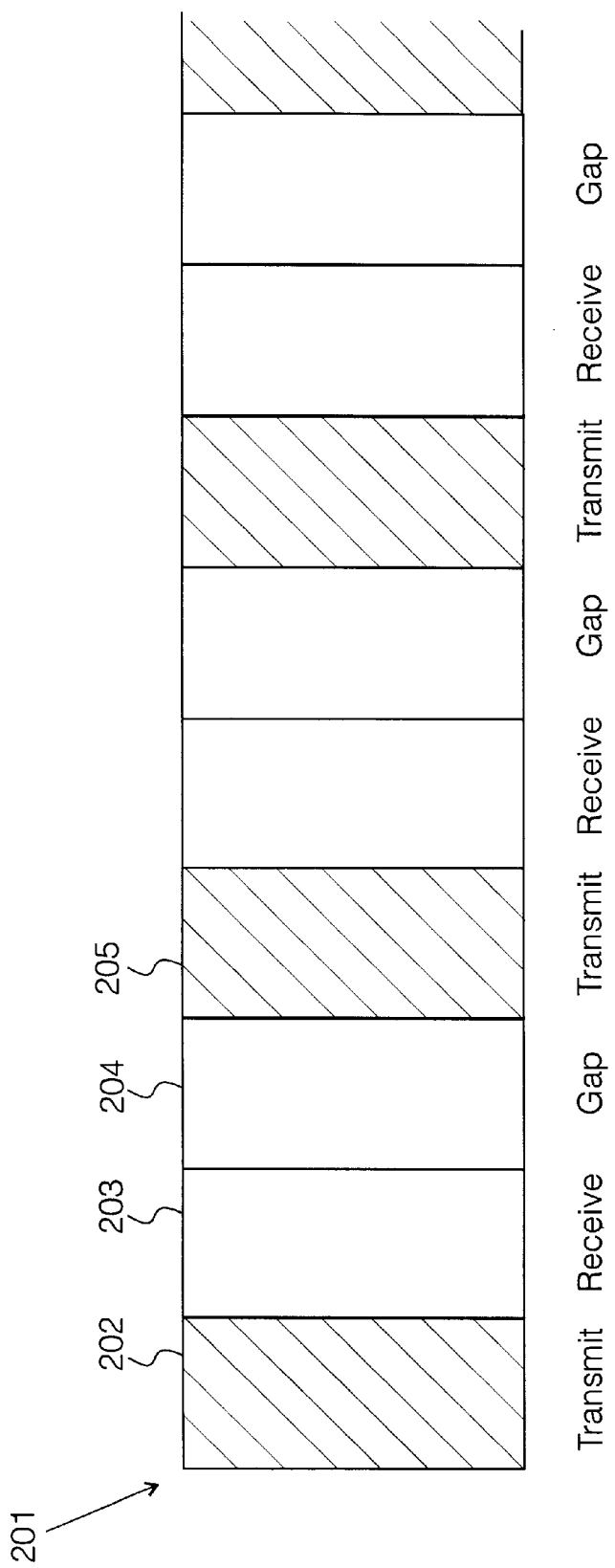
Figures 3, 4:
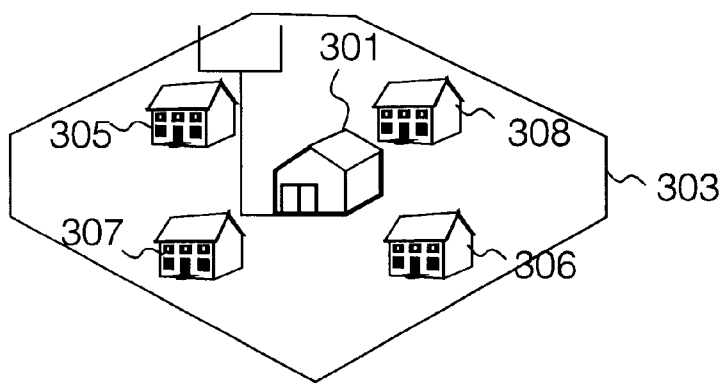
FIG. 3 illustrates schematically a radio base station providing air interface coverage for A cell, the cell comprising subscribers forming a user group.
FIG. 4 illustrates data which may be associated with the user group illustrated in FIG. 3.

FIG. 3 of the accompanying drawings illustrates schematically part of a Fixed Wireless Access (FWA) telecommunications network in accordance with the preferred embodiment. A Radio Base Station (RBS) 301 provides cellular coverage, typically in urban environments over a 4 kilometer radius, to a plurality of subscriber radio terminals. The RBS may be connected to a backbone network, eg a public switched telecommunications network (PSTN) switch via a conventional transmission link, known as a backhaul link, thereby providing the plurality of subscribers with access to the PSTN. A single base station may serve several thousand subscribers. Communication between a subscriber's Network Terminal Equipment (NTE) and its corresponding RBS is via a local wireless Radio Frequency (RF) link using a known Air Interface Protocol (AIP). Each local wireless link between a RBS and a subscriber's NTE comprises an uplink from a subscriber antenna, part of a Residential Subscriber System (RSS) installed at the subscriber's premises, to the RBS antenna, and a downlink transmitting from the RBS to the subscriber's RSS. Downlink beam coverage is provided in a nominally hexagonal cellular pattern. Each RBS operates either an omni-directional beam or a plurality of broad sectorized beams encompassing all subscribers in a cell or sector for receive and transmit, whereas each subscriber's RSS may operate a directional pencil beam directed at the RBS for receiving and transmitting.

In FIG. 3, RBS 301 provides coverage for A cell 303. Cell 303 may be divided into sectors, for example 3 sectors each covering a 120 degree portion of the cell. It would be appreciated by those skilled in the art that other common configurations of cellular transmission may be used, for example, tri-cellular. According to the preferred embodiment, each timeslot in the RBS's downlink beam comprises a logical channel. A logical channel may be transmitted between RBS and subscriber's RSS on a specific carrier frequency (which may be called a "physical channel"). A logical channel transmitted to/from RBS 301 from/to a subscriber RSS may be uniquely identified by a logical channel identification data. Each logical channel is intended to be shared by a group of subscribers' RSS each of which are connected to Internet terminals which have been registered as users. In a group of registered users, each user's RSS preferably includes a line intended for use with a NTE such as a telephone handset or fax and also a line intended for use with an Internet terminal such as a modem attached to a Personal Computer (PC) 109. A group of registered users which share a specific logical channel transmitted to/from RBS 301 may comprise up to four subscribers whose premises are all located in the same cell, 303, covered by RBS 301. If the cell is sectorised, the members of the user group may be located in a single sector of the cell. In the example shown in FIG. 3, the RBS's user group which share a single logical channel transmitted to/from RBS 301 includes subscribers 305, 306, 307 and 308 in cell 303. The user group may be called a "closed" user group as data transferred on the group's shared logical channel is not intended to be listened to by any other users and preferably up to a maximum of four users must be registered users who have joined as members of the group before sharing the logical channel. Members of a closed user group may be given a password in order to join the group, thereby improving security.

Preferably, each downlink PDU broadcast on the shared logical channel during a single frame by RBS 301 to subscribers 305–308 includes data representing a token. The token comprises a code denoting which of the subscribers 305–308 may use the uplink transmission to transfer data to RBS 301 in a next frame. Preferably, RBS 301 and subscribers' 305–308 RSSs are configured such that when the logical channel timeslot used by the group is required for circuit switched data the group suspend their use of the shared logical channel in order to give way to the circuit switched data.

FIG. 4 of the accompanying drawings illustrates data which may be associated with a group of users, such as the closed user group illustrated in FIG. 3. Electronic signals representing the data may be stored and accessed by the user's RSSs and/or RBS 301. As each user in the group is a subscriber of the FWA telecommunications network, each user's has a Permanent NTE Identifier (PNID). The PNID is used as a unique identifier which is used by the network operator for billing the customer, etc. A PNID may also be used by network equipment to route connections to a particular subscriber's NTE, etc. Each user group is given a Group Identifier (GID) which may be a unique value assigned to a group of users sharing a logical channel transmitted by a particular RBS. Thus, the GID for all users belonging to a particular group will be identical. Each user in the group is also preferably assigned a User Identifier (UID) which may be a unique identifier for each user in the group. A UID and GID are preferably allocated to a user during a user registration process described hereinbelow. Thus, each user in a closed user group may be uniquely identified by data representing their GID and UID, as well as their PNID. For example:

| User | PNID | GID | UID |
|------|------|-----|-----|
| 305  | 234  | 2   | 0   |
| 306  | 200  | 2   | 1   |
| 307  | 212  | 2   | 2   |
| 308  | 253  | 2   | 3   |

Figure 5:
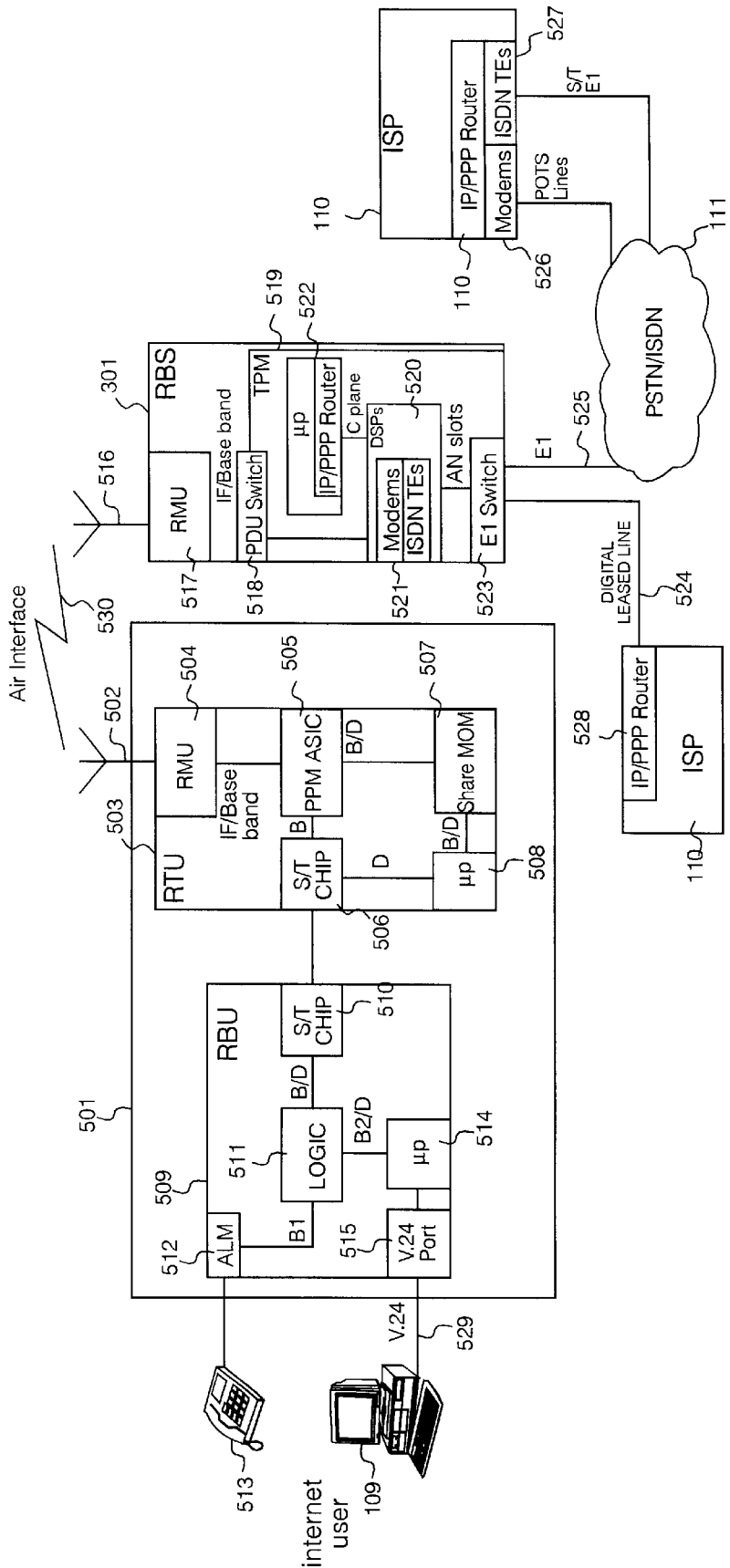
FIG. 5 illustrates schematically components of a radio base station, a user's Internet terminal and a residential subscriber system connected to a first Internet service provider over a telecommunications network and a second Internet service provider connected by a digital leased line.

FIG. 5 of the accompanying drawings details schematically components of the FWA system illustrated in FIG. 3. A RSS 501 may be installed at each of the premises of users 305–308. RSS 501 comprises a RF antenna 502 which may be connected to a Residential Transceiver Unit (RTU) 503. RTU 503 can transmit/receive RF signals to/from antenna 502 by using a Radio Modem Unit (RMU) 504. RMU 504 can communicate with PPM Application Specific Integrated Circuit (ASIC) 505. Preferably, circuit switched traffic received at antenna 502 is transferred to S/T chip 506. Preferably, packet switched data is transferred from PPM ASIC 505 to Share MOM component 507. Share MOM component 507 can communicate data with microprocessor 508. Preferably, microprocessor 508 executes instructions for converting data received at antenna 502 into a form suitable for S/T chip 506. The instructions preferably convert data by interfacing between a series of protocols according to the preferred embodiments described herein below.

RSS 501 may also comprise a RSS Board Unit (RBU) 509. RBU 509 comprises a S/T chip 510 which is preferably capable of communicating with S/T chip 506 of RTU 503. Data is transferred from S/T chip 510 to logic component 511. Logic component 511 is capable of routing circuit switched data to ALM component 512. ALM 512 may be connected to subscriber NTE equipment suitable for circuit switched traffic, for example telephone handset 513. Logic component 511 preferably transfers packet switched data to microprocessor 514. Microprocessor 514 preferably executes instructions for converting data to/from a format compatible with V.34 commands according to protocols used by the preferred embodiments. Microprocessor 514 may transfer converted data to V.24 port 515 and receive data for conversation from V.24 port 515. V.24 port 515 can communicate with the user's Internet terminal equipment 109 by means of a V.24 serial interface 529, which may be configured to be asynchronous or synchronous. Alternatively, user terminal 109 may communicate with RSS 501 by means of a purely digital line.

RBS 301 comprises an antenna 516. Signals may be transferred to/from antenna 516 of the RBS from/to antenna 502 of the RSS via a known air interface 530 preferably using RF links. Antenna 516 is preferably connected to a Transceiver Microwave Unit (TMU) 517. TMU 517 preferably communicates with a Packet Data Unit (PDU) switch component 518 by means of IF/base band signals. The PDU switch 518 is preferably contained within a Transceiver Processor Module (TPM) 519 of RBS 301. TPM 519 also comprises digital signal processors 520, which communicate with the PDU switch 518 using AI (Air Interface) slots. The digital signal processors 520 may comprise modems and/or ISDN Terminal Equipment 521. The digital signal processors 520 may also be connected to microprocessor 522 by means of an Internet Protocol (IP)/ Point to Point Protocol (PPP) router 522. Microprocessor 523 may be used to convert data received at antenna 516 into a format suitable for routing across a PSTN, ISDN or digital leased line, for example the known E-1 format. Digital signal processors 520 preferably transfer data to an E-1 switch 523 by means of Access Node (AN) slots. The E-1 switch preferably gives RBS 301 access to a backbone telecommunications network 111, for example a PSTN or an ISDN by means of an E-1 backhaul cable 525. Packet data being transferred to/from RBS 301 via telecommunications network 111 may be received by ISP 110 which is connected to the network. ISP 110 may comprise modems for communicating data with telecommunications network 111 if it is a PSTN. ISP 110 may comprise ISDN Terminal Equipment 527 for communicating with telecommunications network 111 if the network is an ISDN by means of S/T or E-1 signals. Modems 526 and/or ISDN terminal equipment 527 may be connected to an IP/PPP router 528 of ISP 110.

Alternatively, if ISP 110 is connected directly to RBS 301 by means of a digital leased line 524 (this may be the case when ISP 110 is also a telecommunications network operator), which typically provides more reliable and faster transfer of data between the ISP and the RBS. RBS 301 may communicate data across the digital leased line 524 to a PPP/IP router 528 of ISP 110.

An example of operation of the RBS 301 and an Internet TE 109 connected to a RSS installed for one of subscribers 305 to 308 which has been registered and joined as a member of a closed user group for sharing a logical channel transmitted by RBS 301 may be as follows (it will be appreciated that substantially similar operation will occur for all other members of the user group, or for a member of any other user group sharing another single logical channel):

A member of the user group wishing to web browse may turn on their Internet user terminal 109 and operates conventional web browse software within the terminal, which generates packet switched data. The packet switched data is sent to and converted by the user's RSS 501, preferably by means of protocol stacks described hereinbelow, into a form which can be transmitted over the air interface.

The RSS communicates packet switched data, over a known uplink access channel eg ALOHA, which is received by RBS 301. The uplink transmitted packet switched data may be for example a service request for Internet services provided by Internet service provider 110, or alternatively may be a short message, for example an e-mail message. The packet switched data may share the uplink transmission with the normal circuit switched connection requests which are transmitted by an RSS requesting bearer slot resources when subscribers wish to make circuit switched connections. Since the packet switched data shares the uplink transmission, and requests for circuit switched connections also occupy these transmissions, in the best mode herein the logical channels transferring packet switched data are configured to yield channel capacity typically when no or few timeslots are available for circuit switched data (which may be a preset number of timeslots selected to ensure a particular quality of service), giving priority to circuit switched connection requests in an attempt to ensure that circuit switched data transfer quality of service is of an acceptable level. Similarly, on the downlink transmission, the downlink transmission is similarly configured to give priority to circuit switched traffic.

In a connectionless network service each packet of information between a source and destination network component travels independently of any other packet. In practice, FWA networks may be capable of operating in either a connectionless or a connection oriented mode. A datagram may comprise a self-contained package of data that carries enough information to be routed from a source to a destination network component independently of any previous and subsequent data exchanges. There may be a probability that any datagram may be lost or damaged before reaching its destination.

Thus, there may be two reasons why connectionless bearer datagram services are preferred. Firstly, because there is an advantage in giving way to voice traffic relatively rapidly as system capacity is increasingly utilized, and secondly for achieving a quick reclamation of spare bandwidth when there is spare capacity available. Under some circumstances, the radio base station may request a subscriber to give up a timeslot used for packet switched data, to release that timeslot for circuit switched connections, not primarily because of lack of capacity in a sector as a whole, but for ease of management of circuit switched connections, causing as little disruption as possible to circuit switched services.

On the uplink, the connectionless bearer service comprises an uplink pilot packet having a relatively long training sequence and being self-contained. Because the training sequence is relatively long, receipt of the whole packet on the uplink is more likely to be received error-free. However, on the downlink, conventional Internet Protocol (IP) packets are preferably used.

On the downlink, a downlink distribution logical channel is listened to continuously by members of the user group who share the logical channel. Data packets are broadcast from the radio base station on that downlink distribution logical channel for all four members of the user group. Each user's RSS may use IP to pick off data packets addressed to that particular RSS. Up to 128 downlink distribution channels may be accommodated, with four subscribers listening to each downlink distribution channel, giving a maximum capacity of 512 subscribers, assuming no yielding to circuit switched voice data traffic. For each sector covered by the RBS, a maximum number of logical channels may be 60, each timeslot comprising a logical channel. Thus, for each logical channel there is a closed user group of up to four subscribers listening to that channel.

On the uplink, the four members of the user group may share one logical channel. To avoid conflicts of subscribers using a logical channel on the access uplink channel simultaneously and thereby colliding, uplink transmission is controlled by use of a token. Allocation of the token is made by transmission of a token address on the downlink. Within each logical channel, data packets being broadcast on the downlink may include a token address which specifies which subscriber of the user group sharing the logical channel has a right to transmit on the uplink, on a next frame. This token mechanism is intended to resolve contention of access channel resources on the uplink.

The service request may be decoded at the RBS and recognized as being an Internet data service request, rather than a connection set-up request.

The RBS sends the packet switched data to its TPM 519. The TPM's microprocessor and IPP/PP router 522 preferably contains a database listing RSS identification data, and corresponding Internet protocol addresses for user terminals at those respective RSSs. The database information may be configured during provisioning or registration of the RSSs, or provisioning or registering of the asymmetric packet switched data service on existing RSSs. The TPM determines from the air interface protocol address received, a corresponding Internet Protocol address of a user terminal at that RSS, from the database. The TPM may convert the received packet switched data from a form suitable for carrying over the wireless link to a form which is recognizable by Internet service provider 110. The TPM may communicate with Internet service provider 110 by a variety of mechanisms, depending on configuration of the RBS. Where the RBS is connected to Internet service provider 110 by private leased line 524, the request for packet switched data (an Internet service request) is forwarded directly to Internet service provider 110 over the line. Internet service provider 110 responds by providing packet switched Internet data services which are returned over leased line 524 to the RBS which transmits the packet switched data via its TMU 517 over the sectorized downlink beam on a downlink distribution channel carried on an logical channel as a downlink carrier frequency. The downlink distribution channel is received by a plurality of RSSs, including the RSS which originated the packet switched data requesting the Internet service data. The RSS which originated the request for Internet service data receives the retrieved packet switched Internet service data and recognizes that the Internet service data is addressed to itself, by virtue of the conventional Internet protocol and converts into a form suitable for user terminal 109.

Alternatively, where leased line 524 is not used, the RBS signals to its E1 switch 523 to set up a circuit switched modem call over E1 line 525 to the Internet service provider 110 over the communications network 111. The packet switched service request for packet switched Internet service data is sent from the RBS across the circuit switched connection to Internet service provider 110. The Internet service provider responds by providing Internet service data over the circuit switched connection which is received at the RBS. On receipt of the packet switched Internet service data, the RBS forwards this packet switched data to its TMU 517 which transmits the packet switched data (Internet service data) on the downlink logical channel which is received by the RSS originating the service request. The RSS receives the packet switched Internet service data and recognizes that data according to the conventional Internet protocol and preferably sends it to Internet TE 109 over the V.24 line 529.

For example, user terminal 109 connected to the RSS may have an Internet protocol address 47.10.11.1. However, when user terminal 109 sends a request for Internet service data (packet switched data) to the RSS, this information is preferably translated into a PNID, that is to say an address which is recognized by the fixed wireless access protocols. Additionally, identification data used internally by the fixed wireless access system may be appended to the IP address, for example the UID, identifying the subscriber, and the GID identifying the user group sharing a downlink logical channel to which the user belongs. This identification information may be used to distinguish between different user terminals attached to a single RSS. Thus, the Internet application layer address 47.10.11.1 which is understood by Internet service provider 414 is interworked with address data specific to the fixed wireless access system prior to transmission over the wireless link on the uplink contention access channel. Upon receipt at the RBS, the interworked data is translated into a format which is understandable by Internet service provider 110, preferably by the RBS's TPM 519. The TPM may achieve the translation through use of a look up table which maps IP address against subscriber lines of the subscriber RSS, preferably stored in microprocessor and IP/PPP router 522. For example, where the user terminal has a registered internal address. Within the table, there may exist mappings between IP address and PNID. For example:

47.11.11.2—234
IP address PNID

In response to the service request Internet service provider 110 issues service data eg web pages or like computer data which is routed via the backbone network 111 to RBS 301. On receipt of the service data, the RBS may segregate the Internet service provider's response service data and transfers the data to TMU 517 for transmitting via the air interface as packet switched data. The service packet is transmitted by a sectored downlink beam, which covers an area containing several subscribers, eg one of cells 302-304 where the user group is located. Although the downlink packet may be received by several subscribers' RSSs, only the RSS to which the downloaded service data is addressed in accordance with IP may decode the service data contacted within the packet. Typically, the amount of service data received in response to the service request is significantly larger in terms of number of bytes than the number of bytes in the service request message.

Figure 6:
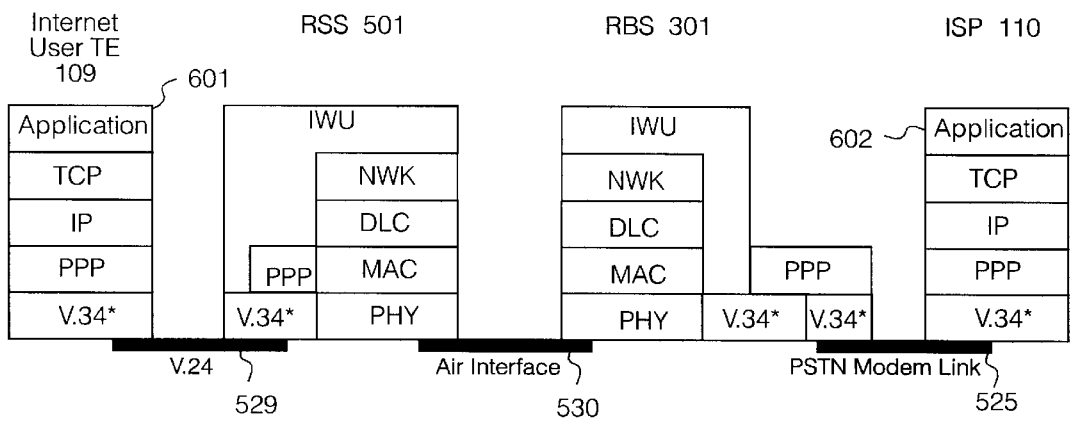
FIG. 6 illustrates schematically protocol stacks intended for transferring data between the components of FIG. 5 when the telecommunication network comprises a PSTN.

FIG. 6 of the accompanying drawings illustrates schematically protocol stack intended for transferring data between a user's Internet terminal equipment 109, RSS 501, RBS 301 and ISP 110 when network 111 comprises a PSTN. A protocol stack comprises a set of protocols governing information exchange of information between the components at a number of layers, and a set of interfaces governing exchange between adjacent protocol layers. The protocols are intended to exchange information between co-operating components, such as those shown in FIG. 5, wherein the components usually communicate by passing information across a local interface to so-called lower level protocols until a lowest, physical layer is reached. Data is transferred from one component to another using the physical layer protocol, and then passes upward via the interfaces until it reaches a corresponding level at a destination component. A common communications model including layers is the ISO/CCITT seven layer reference model. The lowest layer of the seven layer reference model is the physical layer. A data link layer is a next highest layer of the seven layer reference model. A Media Access Control (MAC) (sub)layer may exist between the physical layer and the data link layer. A network layer is the next highest layer of the seven layer reference model. A highest layer of the seven layer reference model is the application layer.

The application layer for user Internet Terminal Equipment 109 preferably comprises application software 601, which is stored as instructions in the PC's memory and executed on its processor. Software 601 may be a World Wide Web browser or e-mail software or any other software application which may require Internet access. The network layer of user NTE 109 may comprise Transmission Control Protocol (TCP). TCP is intended to provide error-free delivery of arbitrarily long messages, known as segments, with the data being released to a host system in a same order as an original transmission. The error free delivery may be achieved by means of a sliding window mechanism. The data link layer for the user NTE 109 may comprise IP. IP is intended to provide a connectionless datagram service, and a managed address structure for data transmission. An IP address can take one of four forms, class A to class D, which always occupies a total of 32 bits. A first group of bits define a class of the address; a second group of bits define an identity of a sub-network attach to the Internet. A final group of bits define an address of a host system within the sub-network. IP allows a long datagram to be fragmented into numbered packets, which can then be transmitted and reassembled in their correct sequence at a destination component. IP is intended to be used in conjunction with TCP. The MAC layer of user NTE 109 may comprise PPP. PPP is intended to allow IP traffic to be handled on a serial line such as the V.24 line 529 connecting NTE 109 to RSS 501. The physical layer for user NTE 109 may comprise V.34 modem control protocol of the known Hayes Command Set. The V.34 commands are widely used for connecting PCs to modems and are used in the preferred embodiment so that software applications 601 which require Internet access can be used with no or little modification as the present invention intends to provide Internet access to user terminal equipment over an FWA system as if it were connected to a conventional wire based network via a conventional modem. V.34 commands of user Internet terminal equipment 109 may be transferred to RSS 501 by means of V.24 serial interface 529.

Suitably, the physical layer of RSS 501 also comprises the V.34 modem control protocol and the physical layer protocol of the air interface. The MAC layer of RSS 501 preferably comprises PPP and the MAC layer protocol of the air interface. The MAC layer of RSS 501 may also comprise an Internet Wireless Unit (IWU). The IWU may also provide an interface between the RSS's MAC layer and its data link layer, its network layer and its application layer performing certain processes and converting data, including data generated and used by the processes, into a form readable by various components' layers. The data link layer of RSS 501 may comprise the data link protocol of the air interface. The network layer of RSS 501 may comprise the network layer protocol of the air interface. The physical layer of RSS 501 preferably communicates with the physical layer of RBS 301 via air interface 530.

The physical layer of RBS 301 preferably comprises V.34 modem control protocol and preferably the complete Hayes V.34 operation and the physical layer protocol of the air interface. The MAC layer of RBS 301 may comprise PPP and the MAC layer protocol of the air interface. The MAC layer may also include IWU which provides an interface between the RBS's MAC layer and its data link layer, its network layer and its application layer. The data link layer of RBS 301 preferably comprises IP and/or the data link layer protocol of the air interface. The network layer of RBS 301 preferably comprises TCP and/or the network layer protocol of the air interface.

The physical layer of RBS 301 preferably communicates with the physical layer of ISP 110 by means of a PSTN modem link 525. The physical layer of ISP 110 preferably comprises the Hayes V.34 protocol. The MAC layer of ISP 110 preferably comprises PPP. The data link layer of ISP 110 preferably comprises IP. The network layer of ISP 110 preferably comprises TCP. The application layer of ISP 110 preferably comprises software 602 which provides Internet services compatible with services of the kind required by the user's software application 601. The ISP application software 602 may act as a server providing WWW information, e-mail accounts and the like.

Figure 7:
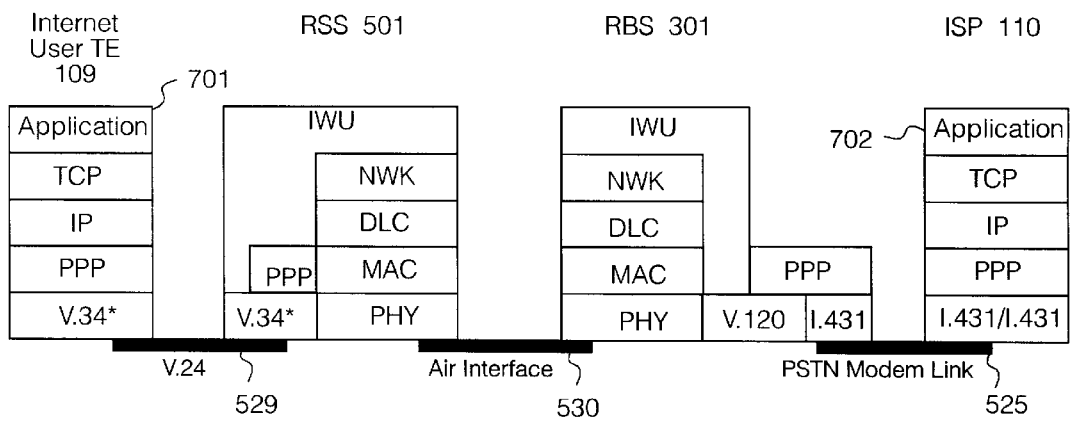
FIG. 7 illustrates schematically protocol stacks intended for transferring data between the components of FIG. 5 when the telecommunication network comprises a ISDN.

FIG. 7 of the accompanying drawings illustrates schematically protocol stacks intended for transferring data between a user's Internet terminal equipment 109, RSS 501, RBS 301, ISP 110 where network comprises an ISDN. The application layer for user Internet terminal equipment 109 preferably comprises application software 701 which may be identical or substantially similar to application software 601. The network layer of user NTE 109 may comprise TCP. The data link layer for the user NTE 109 may comprise IP. The physical layer for user NTE 109 may comprise V.34 modem control protocol of the known Hayes Command Set. V.34 commands of the user Internet terminal equipment 109 may be transferred to RSS 501 by means of V.24 serial interface 529.

Suitably, the physical layer of RSS 501 also comprises the V.34 modem control protocol and the physical layer protocol of the air interface. The MAC layer of RSS preferably comprises PPP and the MAC layer protocol of the air interface. The MAC layer may also comprise IWU. The IWU may also provide an interface between the RSS's MAC layer and its data link layer, its network layer and its application layer. The data link layer of RSS 501 preferably comprises the data link layer protocol of the air interface. The network layer of RSS 501 preferably comprises the network layer protocol of the air interface. The physical layer of RSS 501 preferably communicates with the physical layer of RBS 301 via the air interface 530.

The physical layer of RBS 301 preferably comprises the V.34 modem control protocol and preferably the complete Hayes V.34 operation and the physical layer protocol of the air interface. The MAC layer of RBS 301 may comprise PPP and the MAC layer protocol of the air interface. The MAC layer may also include IWU which provides an interface between the RBS's MAC layer and its data link layer, its network layer and its application layer. The data link layer of RBS 301 preferably comprises IP and/or the data link layer protocol of the air interface. The network layer of RBS 301 preferably comprises TCP and/or the network layer protocol of the air interface. The Physical layer of RBS 301 preferably communicates with the physical layer of ISP 110 by means of Basic Rate ISDN (BRI) 525. The physical layer of RBS 301 preferably comprises the known V.120 protocol and the known 1.431 protocol.

Suitably, the physical layer of ISP 110 comprises the known 1.430/1.431 protocol. The MAC layer of ISP 110 preferably comprises PPP. The data link layer of ISP 110 preferably comprises IP. The network layer of ISP 110 preferably comprises TCP. The application layer of ISP 110 preferably comprises software application 702 which may be identical or substantially similar to software application 602.

Figure 8:
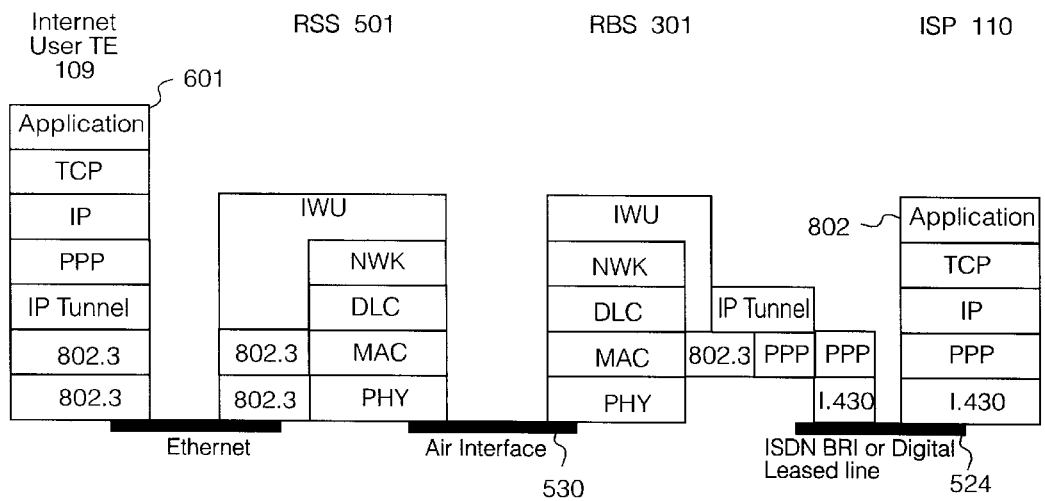
FIG. 8 illustrates schematically protocol stacks intended for transferring data between the components of FIG. 5 when the Internet service provider is connected by means of the digital leased line.

FIG. 8 of the accompanying drawings illustrates schematically protocol stacks intended for transferring data between a users Internet terminal equipment 109, RSS 501, RBS 301 and ISP 110 when ISP 110 is connected to RBS 301 by means of a digital leased line 524. The application layer for user Internet terminal equipment 109 preferably comprises application software 801, which may be identical or substantially similar to a software application 601. The network layer of user NTE 109 preferably comprises PPP. The network layer may also comprise TCP and/or IP. Alternatively, layers between the application layer and the network layer of the seven layer reference model (ie presentation layer, session layer, transfer layer) may comprise TCP and/or IP. The data link layer of user NTE 109 preferably comprises IP tunnel. The MAC layer of user NTE 109 preferably comprises the known 802.2 protocol. The physical layer of user NTE 109 preferably comprises the known 802.3 protocol. Data may be transferred from the physical layer of user NTE 109 to the physical layer of RSS 501 by means of Ethernet (defined in ISO 802.3).

Suitably, the physical layer of RSS 501 may comprise 802.3 protocol and the physical layer protocol of the air interface. The MAC layer of RSS 501 may comprise the 802.2 protocol and the MAC layer protocol of the air interface. The data link layer of RSS 501 may comprise IWU and the data link layer protocol of the air interface. The IWU may provide an interface between the RSS's data link layer, its network layer and its application layer. The network layer of RSS 501 preferably comprises the network layer protocol of the air interface. The physical layer of RSS 501 preferably communicates with the physical layer of RBS 301 via air interface 530.

The physical layer of RBS 301 preferably comprises the known 1.430 protocol and the physical layer protocol of the air interface. The MAC layer of RTBS 301 preferably comprises the known 802.2 protocol and PPP and the MAC layer protocol of the air interface. The data link layer of RBS 301 may comprise IP tunnel and the data link layer protocol of the air interface. The data link layer of RBS 301 may also comprise IWU. The IWU may provide an interface between the RSS's data link layer and its network layer and its application layer. The network layer of RBS 301 preferably comprises the network layer protocol of he air interface. RBS 301 preferably communicates with ISP 110 by means of digital leased line 524.

The physical layer of ISP 110 preferably comprises 1.430 protocol. The MAC layer of ISP 110 preferably comprises PPP. The data link layer of ISP 110 preferably comprises IP. The network layer of ISP 110 preferably comprises TCP. The application layer of ISP 110 preferably comprises software application 802, which may be identical or substantially similar to software application 602.

Figure 9:
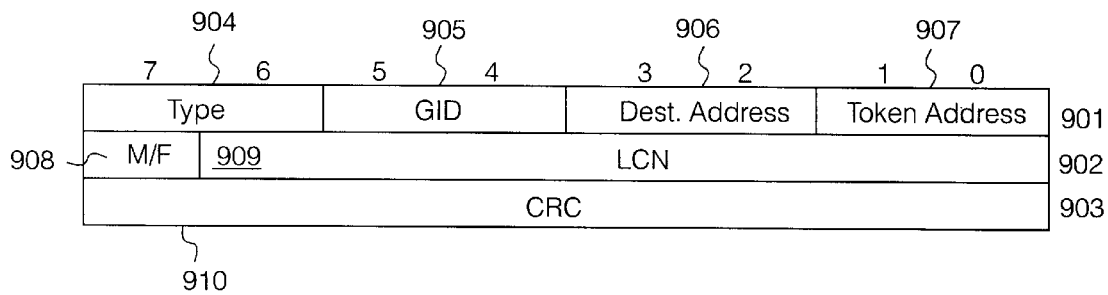
FIG. 9 illustrates a format of a downlink packet data unit used by the preferred embodiment's Media Access Control (MAC) layer protocols shown in FIGS. 6 to 8.

FIG. 9 of the accompanying drawings illustrates a format of a Packet Data Unit (PDU) used by the preferred embodiment's MAC layer protocols on a downlink logical channel broadcast by RBS 301 to a closed user group which shares the logical channel. Preferably, the downlink PDU comprises a substantially unmodified standard IP packet. Each downlink PDU may comprise three 8 bit data lines, each data line may comprise one or more data fields. Each bit in a data line may be labeled with a reference numeral 0-7, with 0 being a least significant bit of the data line and 7 being a most significant bit of the data line. A first data line 901 of the downlink PDU preferably comprises four data fields. Bits 0 and 1 of data line 901 may comprise token address data field 907. The token address field is used to indicate which user of a user group sharing the same logical channel identified by a logical channel number and/or the GID can transmit in a next frame. The value stored in the token address field 907 may be a numerical value between 0 and 3, each value corresponding to a UID of a user in the group. Bits 2 and 3 of data line 901 may comprise a destination address data field 906. The destination address data field 906 is used to distinguish which of the different users of the user group sharing the logical channel identified by the GID is intended to read the PDU. The value stored in the destination address field 906 may be a numerical value between 0 and 3, corresponding to a UID of a user in the user group. Bits 4 and 5 of data line 901 may comprise a GID field 905. The GID field is used to distinguish between different user groups. The value stored in the GID data field 905 may be a numerical value between 0 and 3. Bits 6 and 7 of data line 901 comprise a type data field 904. The type data field is used to distinguish between different downlink MAC message types. The value stored in the type data field 904 may be a numerical value between 0 and 3, each values used to denote a type of message as defined herein below:

0 system broadcast
1 user data
2 MAC control
3 reserved

A second data line 902 of the PDU preferably comprises two data fields. Bits 0 to 6 of data line 902 preferably comprise a Logical Channel Number (LCN) 909. A logical channel is uniquely identified by its LCN and the GID. Each LCN/GID is mapped onto a physical channel which delivers 32 Kb/s in the downlink direction and around 14 Kb/s in the uplink direction. The value stored in the LCN data field 909 may be a value between 0 and 127, corresponding to a unique LCN for the logical channel upon which the Pdu is being transmitted. Bit 7 of data line 902 comprises an M/F bit field 908. The M/F bit field 908 is used to indicate whether the PDU is the final packet to be transmitted by the RBS or whether there are more the follow. The value stored in the M/F bit field may be 0 or 1, wherein the value 1 indicates there are more PDUs to follow and the value 0 indicates no more PDUs to follow. A third data line 903 of the downlink PDU preferably comprises a single 8 bit cyclic redundancy check (CRC) field 910. The CRC field 910 is preferably used for error detecting in the downlink PDU.

Figure 10:
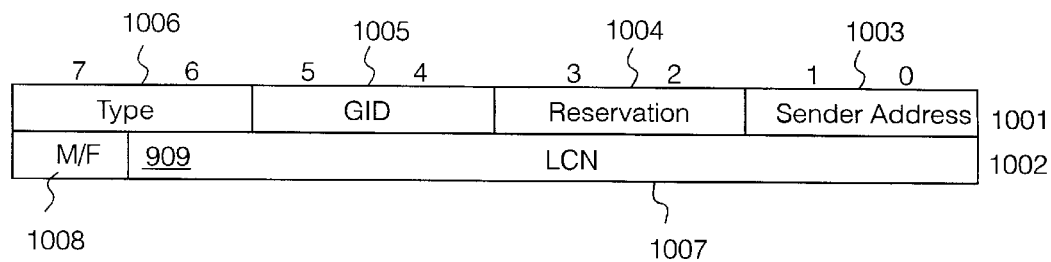
FIG. 10 illustrates a format of an uplink packet data unit used by the preferred embodiment's MAC layer protocols shown in FIGS. 6 to 8.

FIG. 10 of the accompanying drawings illustrates a format of a PDU used by the preferred embodiment's MAC layer on the uplink. The uplink PDU may be a pilot PDU for use in a connectionless datagram service. The uplink pilot packet may have a relatively long training sequence and may be self-contained. As the training sequence is relatively long, receipt of the whole packet on the uplink is more likely to be error-free. Each uplink PDU may comprise two 8 bit data lines, each data line comprising one or more data fields. Each bit in a data line may be labeled with a reference numeral 0 to 7, which 0 being a least significant bit of the data line and 7 being a most significant bit of the data line. A first data line 1001 of the uplink PDU preferably comprises four data fields. Bits 0 and 1 of data line 1001 may comprise sender address data field 1003. The send address data field is used to identify a sender of the uplink PDU. The values stored in sender address data field 1003 may be a numerical value between 0 and 3, corresponding to a UID of a particular user in the group. Bits 2 and 3 of data line 1001 may comprise a reservation data field 1004. The reservation data field may contain a value corresponding to a UID of a user who has reserved the uplink PDU in advance for making data transmissions. Bits 4 and 5 of data line 1001 may comprise GID data field 1005. The GID data field is used to distinguish between different user groups. The value stored in the GID data field 1005 may be a numerical value between 0 and 3. Bits 6 and 7 of data line 1001 may comprise a type data field 1006. The type data field is used to distinguish between different uplink MAC message types. The value stored in the type data field 1006 may be a numerical value between 0 and 3, each value used to denote a type of message as defined hereinbelow:

0 system broadcast
1 user data
2 MAC control
3 reserved

A value 3 (reserved) stored in uplink type data field 1006 and/or downlink type data field 904 may indicate that the next uplink and/or downlink packet respectively, has been reserved for use by a particular member of the user group.

A second data line 1002 of the uplink PDU preferably comprises two data fields. Bits 0 to 6 of data line 1002 may comprise a LCN data field 1007. A value stored in LCN data field 1007 may be a value between 0 and 127, corresponding to a unique LCN for the logical channel upon which the PDU is being transmitted. Bit 7 of bit line 1002 may comprise an M/F it field 1008. The M/F bit field 1008 is used to indicate whether the uplink PDU is a final packet to be transmitted to the RBS of whether there are more to follow. The value stored in the M/F bit field 1008 may be 0 or 1, where the value 1 indicates there are more PDUs to follow and the value 0 indicates no more PDUs to follow.

Figure 11:
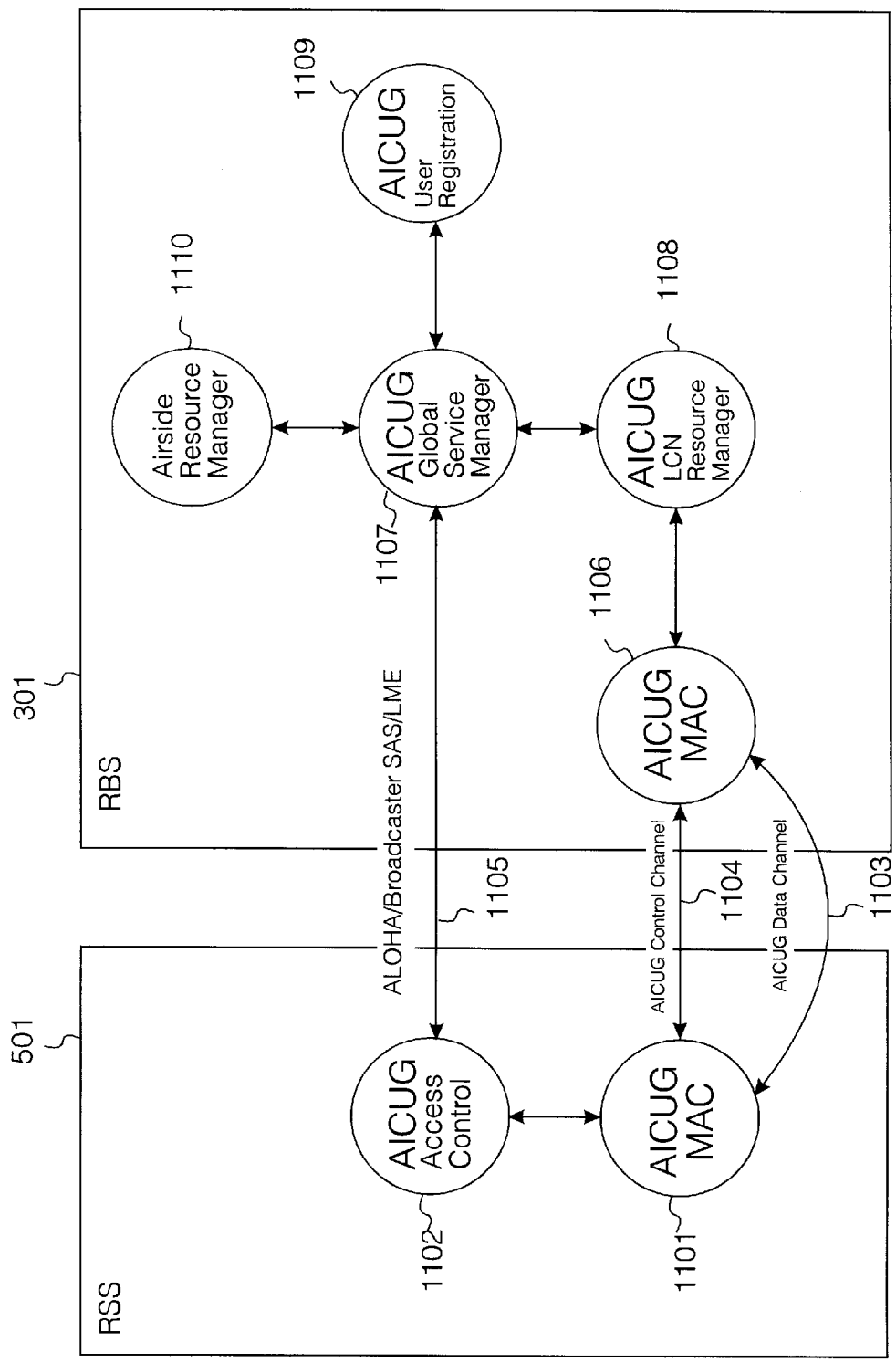
FIG. 11 illustrates functional components of the preferred embodiment's MAC layer.

FIG. 11 of the accompanying drawings illustrates functional components of RSS 501 and RBS 301's MAC layers and higher layers. The functional components may comprise the IWU contained in the protocol stacks of RSS 501 and RBS 301. Functional components of the RSS's MAC layer comprise Air Interface Closed User Group (AICUG) MAC 1101 which may be responsible for controlling transmission of uplink packets and reception of downlink packets to the RSS. AICUG MAC 1102 can communicate with AICUG access control 1102, which may be responsible for routing messages and access control for system messages between the RSS and RBS 301.

Functional components of the RBS's MAC layer may include AICUG 1106 which may be responsible for controlling reception of uplink packets and transmission of downlink packets by the RBS. Functional components of the RBS's MAC layer may also include AICUG global service manager 1102, which may be responsible for overall AICUG service management. Functional components of the RBS's MAC layer include AICUG LCN resource manager 1108, responsible for the RBS's management of logical channels preferably including (logical channel allocation/deallocation, physical channel switching, logical channel suspend and resume operations as described hereinbelow). Functional components of the RBS's MAC layer may also include AICUG user registration component 1109, which may be responsible for registering network subscribers as users. Functional components of the RBS's MAC layer may also include air side resource manager 1110, which is responsible for allocating resources such as timeslots over the air interface protocol.

Air side resource manager 1110 may communicate with AICUG global service manager 1107. The AICUG global service manager 1107 may also communicate with AICUG user registration component 1109. The AICUG global service manager component 1107 may also communicate with AICUG LCN resource manager 1108. AICUG LCN resource manager 1108 may communicate with AICUG MAC 1106. The RSS's functional components 1101 and 1102 may be processes being executed on microprocessor 514 of RBU 509 and/or microprocessor 508 of RTU 503. The RBS's functional components 1106 to 1110 may be processes being executed on microprocessor component 522 or another processor in the RBS's TPM 519.

AICUG 1102 of RSS 501 may communicate with AICUG global service manager 1107 of RBS 301 by means of ALOHA communications channel 1105. Communications channel 1105 may also/alternatively comprise a broadcaster SAS channel and/or an air interface protocol LME channel. AICUG MAC 1101 of RSS 501 may transfer control data to/from AICUG MAC 1106 of RBS 301 be means of AICUG control channel 1104. Data such as packet data containing Internet service requests may be transferred between AICUG MAC 1101 of RSS 501 and AICUG MAC 1106 of RBS 301 by means of AICUG data channel 1103.

Figure 12:
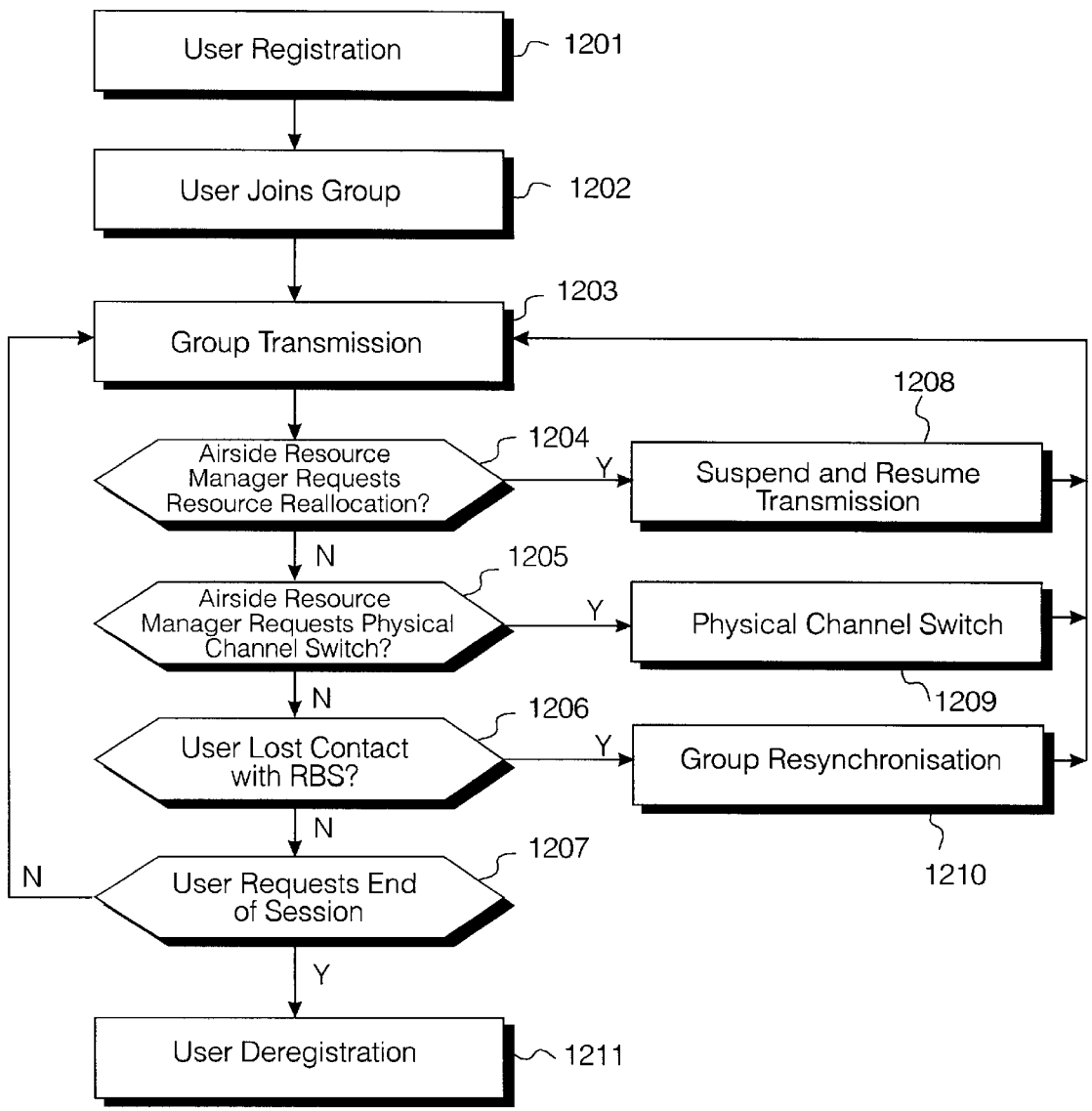
FIG. 12 illustrates steps typically executed by the functional components illustrated in FIG. 11, including a user registration step, a user joins group step, a suspend and resume transmission step, a physical channel switch step, and a group re-synchronization step.

FIG. 12 of the accompanying drawings illustrates steps typically executed by the functional components illustrated in FIG. 11 when a FWA network subscriber uses Internet terminal 109 for a session of accessing Internet data according to the preferred embodiment. At step 1201 the subscriber is registered as a user of the FWA Internet access system. At step 1202 the registered user joins a resource (ie logical channel) sharing closed user group. Steps 1201 and 1202 may be repeated for each user (up to a maximum of four) which may be registered and join as a member of the closed user group. At step 1203 the user may access and transfer Internet data over the FWA system as described hereinabove with examples. At step 1204 a question is asked whether air side resource manager 1110 is requesting resource reallocation of the shared logical channel. This request may occur when the timeslot used as the group's logical channel is required for transmission of FWA circuit switched traffic (eg voice traffic), usually when no more spare air side time slots are available for the circuit switched traffic, or when a predetermined number of timeslots are occupied by circuit switched traffic. If the question asked at step 1204 is answered in the affirmative then control is passed to step 1208 where the timeslot is yielded to circuit switched traffic (called a "suspend" operation). The suspended timeslots may be reused as the group's logical channel when a spare timeslot becomes available (called a "resume" operation).

At step 1205 a question is asked whether air side resource manager 1110 is requesting a physical channel switch. The physical channel switching request may occur in order to ease soft call blocking on FWA circuit switched traffic. If the question asked at step 1205 is answered in the affirmative then control is passed to step 1209 where a physical channel switching process is performed. If the question asked at step 1205 is answered in the negative then control is passed to step 1206.

At step 1206 a question is asked whether the user has lost contact with the RBS. This loss of contact may occur during either a physical channel switch or a spend/resume operation. If the question asked at step 1206 is answered in the affirmative then control is passed to step 1210. At step 1210 the user's Internet TE is required to re-synchronize itself with its closed user group. If the question asked at step 1206 is answered in the negative then control is passed on to step 1207.

At step 1207 a question is asked whether the user desires to end the session. If he question asked at step 1207 is answered in the negative then control is passed back to step 1203. If the question asked at step 1207 is answered in the affirmative, then control is passed to step 1211 where a user de-registration process is performed.

Figure 13:
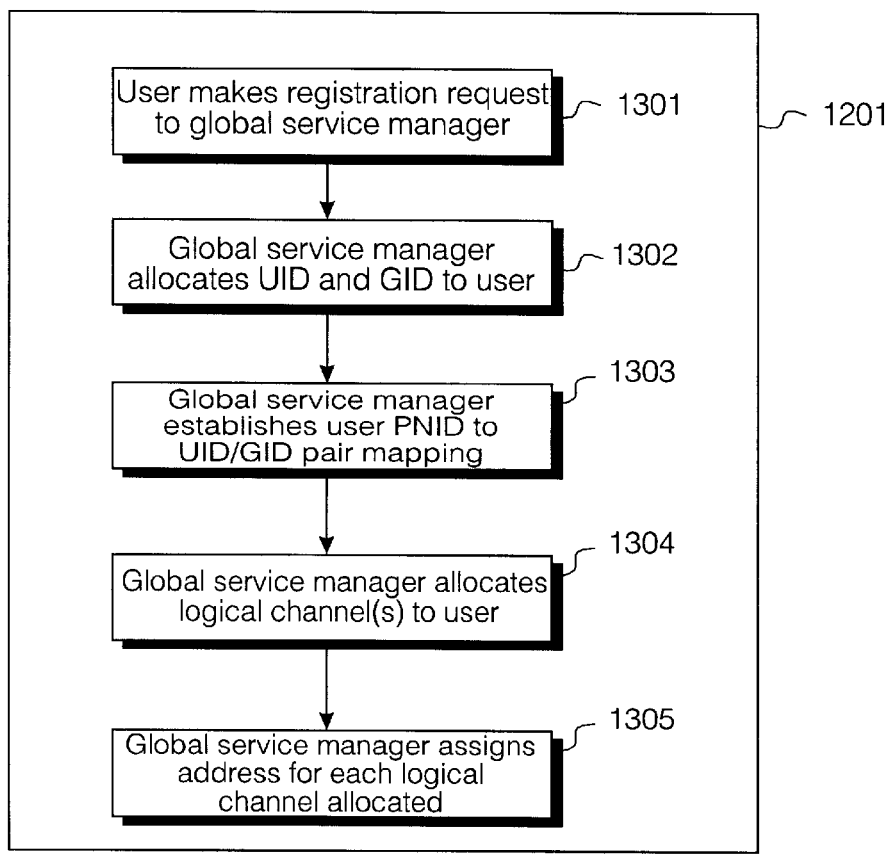
FIG. 13 details steps executed during the user registration step of FIG. 12.

FIG. 13 of the accompanying drawings illustrates steps performed during user registration step 1201. At step 1301 the user makes a registration request to AICUG global service manager 1107 (preferably using this AICUG access control 1102). At step 1302 the global service manager allocates a GID and a UID to the user. At step 1303 the global service manager establishes an association between the user and the GID and UID created for the user at step 1302 by creating and storing a mapping between the user's PNID and the unique UID/GID pair. At step 1304 the global service manager allocates one or more logical channel (according to current resource usage situation) to the user. At step 1305 the global service manager assigns an address for each logical channel allocated to the user. As a result of step 1305 the registered user may be identified by their GID, LCN and address. However, the GID, LCN and address identification is not unique to the user in the sense that the user may join more than one logical channel sharing closed user group.

Figure 14:
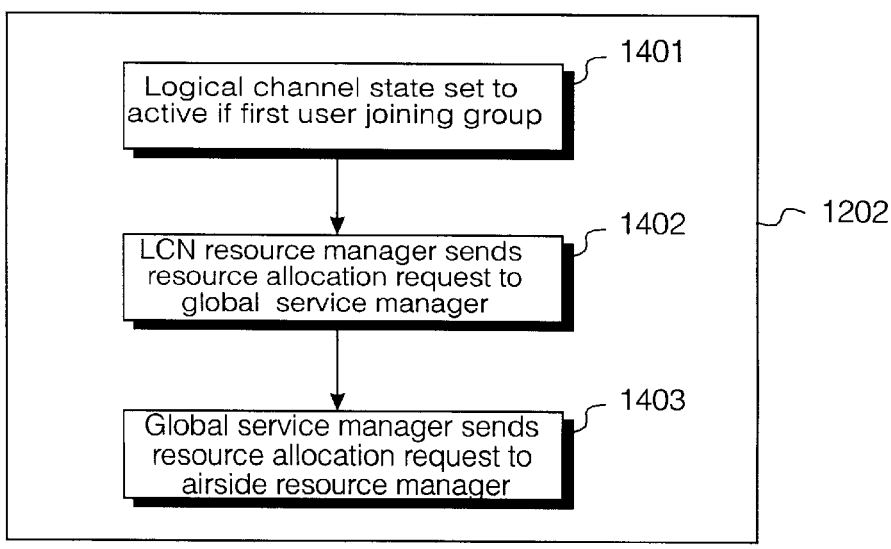
FIG. 14 details steps executing during the user joins group step of FIG. 12.

FIG. 14 of the accompanying drawings illustrates steps which may be performed when the user joins a closed user group at step 1202. Three states may be associated with a particular logical channel. The states may comprise Inactive, Active and Suspended. Storage space, eg a variable, in a storage unit may be reserved for storing data describing the state of each logical channel which may be used by a closed user group. If a particular logical channel is not being used by any user group then its state may be set to Inactive. At step 1401 if the registered user is the first user to join the closed user group during the session then the logical channel's state may be set to Active. At step 1402 LCN resource manager 1108 sends a resource allocation request for the logical channel allocated to the user at step 1304 to global service manager 1107. At step 1403 the global service manager sends the resource allocation request to air side resource manager 1110.

At the end of the session, at user de-registration step 1211 the user's AICUG access control 1102 makes a de-registration request to global service manager 1107. During de-registration step 1211 the global service manager de-allocates the UID allocated to the user and deletes the user's PNID to GID/UID mapping. During de-registration the global service manager also de-allocates the LCN/address pairs belonging to the user. The user's AICUG access control 1102 communicates with the global service manager during de-registration by means of the AICUG system control and management channel 1105. If the user being de-registered is currently the only registered user of the closed user group the group's state may be set to Inactive.

Figure 15:
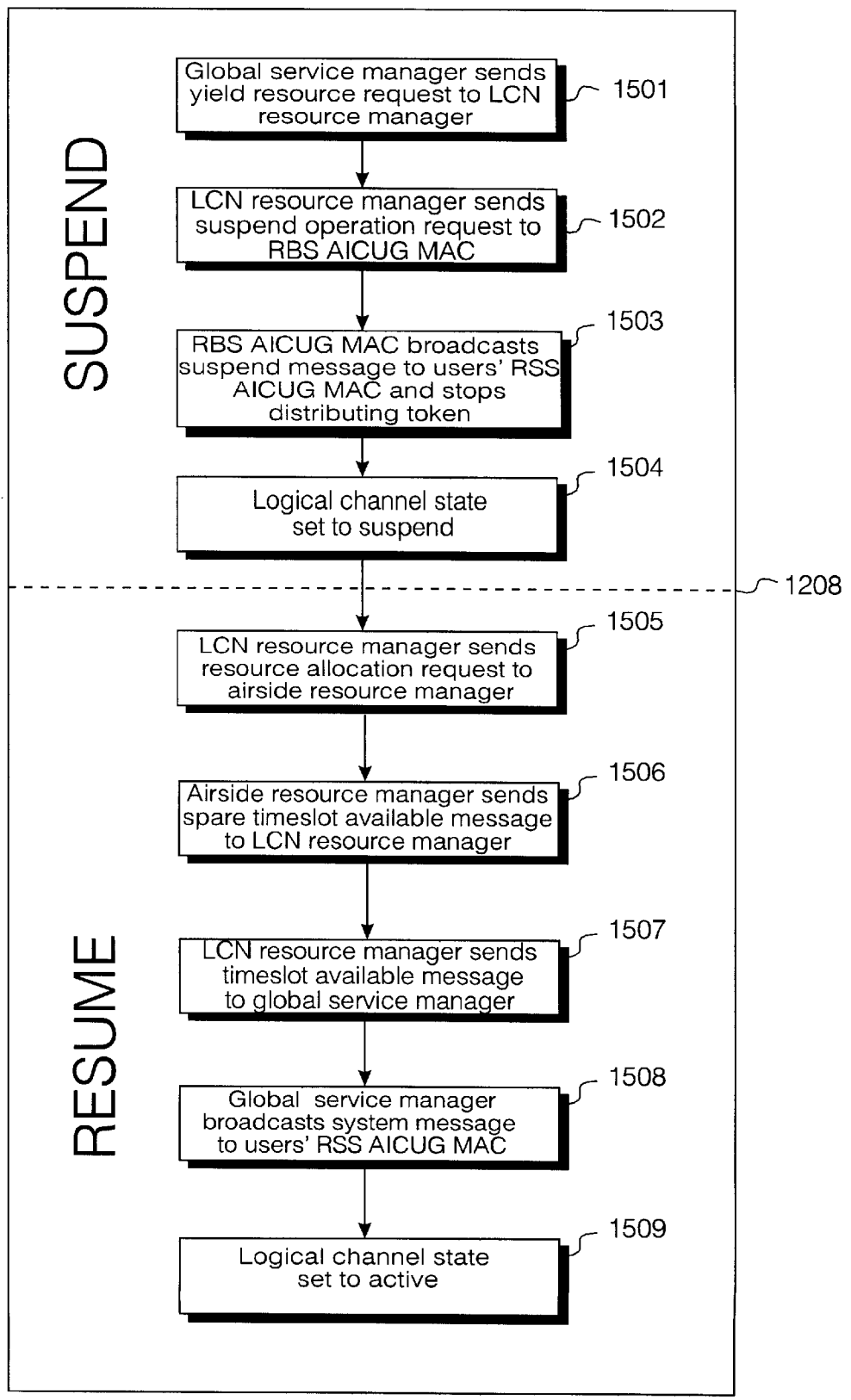
FIG. 15 details steps executed during the suspend and resume transmission step of FIG. 12.

FIG. 15 of the accompanying drawings illustrates steps which may be performed during suspend and resume transmission step 1208. At step 1501 the global service manager 1107 which has received air side resource manager's 1110 resource reallocation request made at step 1204 sends a yield resource request to LCN resource manager 1108. At step 1502 the LCN resource manager sends a suspend operation request to the RBS's AIUG MAC 1106. At step 1503 the RBS's AICUG broadcasts a suspend message to the RSS AICUG MACs of all registered users of the closed user group sharing the logical channel requested. The RBS AICUG MAC also stops distributing the token which determines which user group member can make an uplink data transmission as use of the logical channel is to be suspended. At step 1505 the start of the logical channel is set to Suspended. Steps 1501 to 1505 are associated with suspending use of the logical channel.

At step 1506 the LCN resource manager 1108 sends a resource allocation request for its logical channel to air side resource manager 1110 immediately after the logical channel has been suspended. At step 1507 the air side resource manager sends a spare timeslot available message to the LCN resource manager. At step 1508 the LCN resource manager passes on the time slot available message to global service manager 1107. At step 1509 the global service manager broadcasts a system message to the RSS AICUG MACs of all registered users of the closed user group sharing the logical channel. At step 1510 the logical channel's state may be set to Active. Steps 1506-1510 are associated with resuming use of the logical channel.

Figure 16:
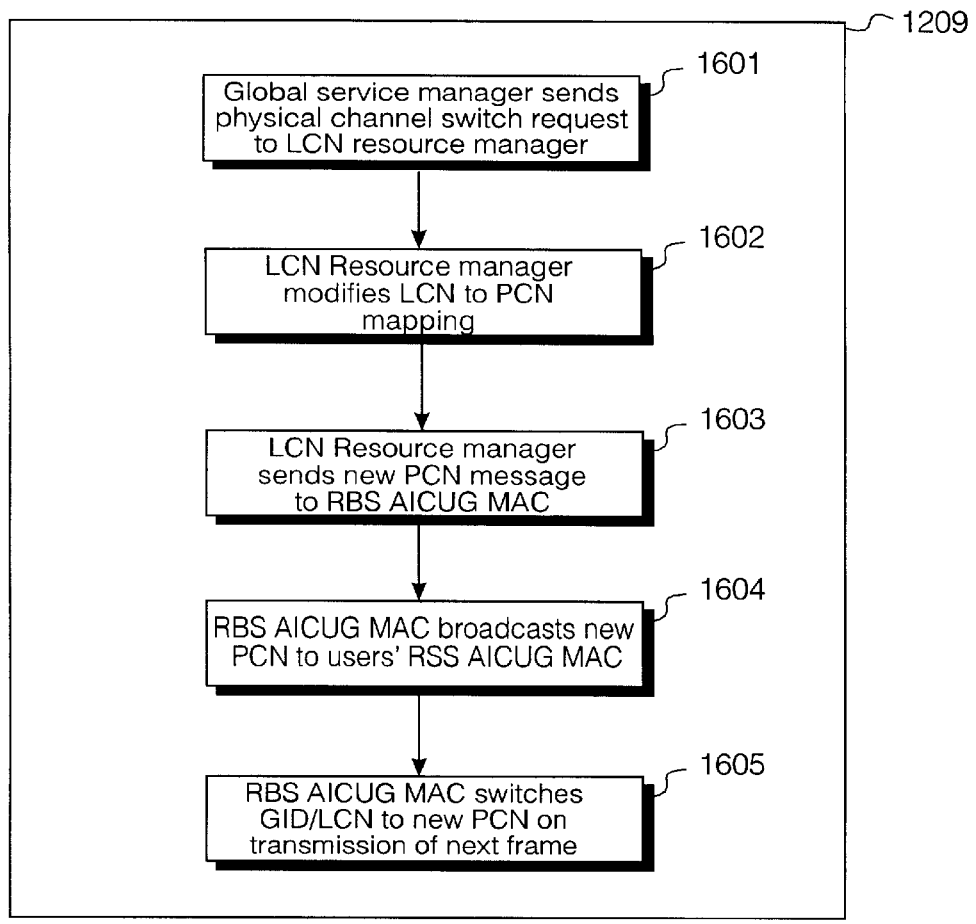
FIG. 16 details steps executing during the physical channel switch step of FIG. 12.

FIG. 16 of the accompanying drawings illustrates steps which may be performed during physical channel switch step 1209. At step 1601 global service manager 1107 sends a physical channel switch request to LCN resource manager 1108. At step 1602 the LCN resource manager modifies a LCN to Physical Channel Number (PCN) mapping by replacing a value corresponding to the current PCN with the new PCN enclosed in the global service manager's request. At step 1603 the LCN resource manager sends a message indicating that a new PCN is to be used to the RBS's AICUG MAC 1106. At step 1604 the RBS AICUG MAC 1106 broadcasts the new PCN to the RSS AICUG MACs 1101 of all registered users of the closed user group sharing the logical channel. On transmission of a next frame after step 1604 the RBS AICUG MAC 1106 changes the closed user group's LCN to the new PCN at step 1605. After step 1605 the physical channel denoted by the old PCN is free for allocation.

Figure 17:
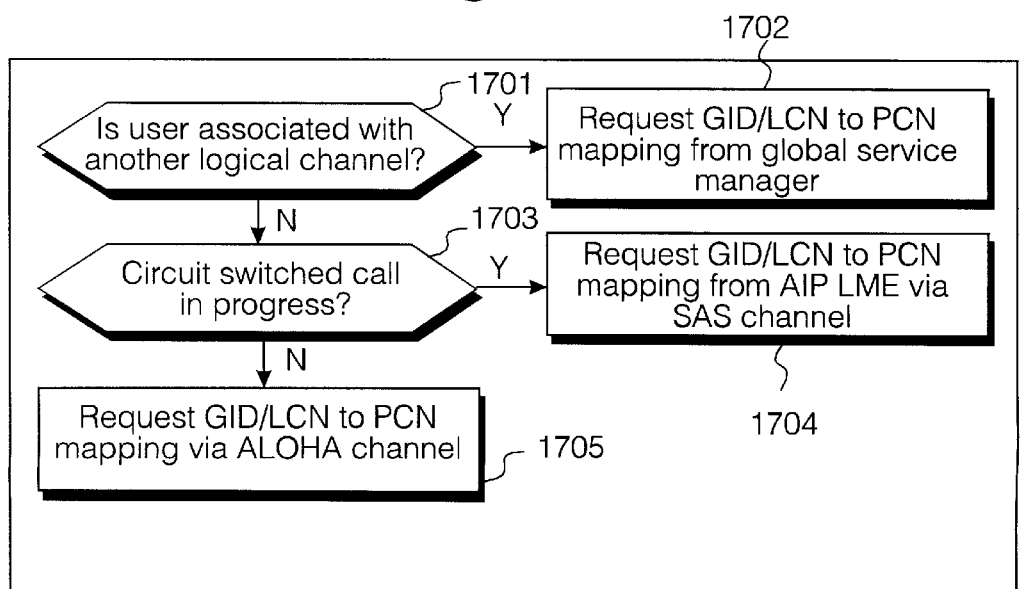
FIG. 17 details steps executed during the group re-synchronization step of FIG. 12.

FIG. 17 of the accompanying drawings illustrates steps which may be performed during group re-synchronization step 1210. At step 1701 a question is asked whether the user which has lost contact with their RBS is associated with another logical channel, ie the user was allocated more than one logical channel at step 1304. If the question asked at step 1701 is answered in the affirmative then control is passed to step 1702. At step 1702 the user's AICUG access control 1102 requests the user's GID/LCN to PCN mapping from global service manager 1107 via a different GID/LCN. If the question asked at step 1701 is answered in the negative then control is passed to step 1703.

At step 1703 a question is asked whether a circuit switched call is in progress. If the question asked at step 1703 is answered in the affirmative then control is passed to step 1704. At step 1704 the user's AICUG access control 1102 requests their GID/LCN to PCN mapping from the air interface protocol LME via the SAS channel of communication channel 1105. If the question asked at step 1703 is answered in the negative then control is passed to step 1705. At step 1705 the user's AICUG access control 1102 requests their GID/LCN to PCN mapping via the ALOHA channel of communication channel 1105. The GID/LCN to PCN mapping data is then transmitted to the user by RBS 301 via AICUG control channel 1104.

What is claimed is:

1. A method of registering a plurality of users of a communications network for receipt of packet switched data services over a wireless link, said method comprising the step of:

receiving a registration request from a said network user;

in response to said registration request, allocating a user identification data to said user;

allocating a group identification data to said user; and allocating at least one logical communications channel to said user;

wherein said step of allocating a logical channel to said user comprises creating an association between said allocated user identification data and said allocated group identification data.

2. The method as claimed in claim 1, wherein said wireless link comprises a fixed wireless access radio link.

3. The method as claimed in claim 1, wherein said user identification data comprises data identifying an address of a user terminal equipment.

4. The method as claimed in claim 1, wherein said step of allocating at least one logical channel to said user comprises:

creating a mapping between data identifying said logical channel, data identifying said user, and data identifying a group allocated to said user.

5. The method as claimed in claim 1, further comprising the step of assigning an address to each said logical channel.

* * * * *